(12) United States Patent
Hoshino

(10) Patent No.: US 7,626,646 B2
(45) Date of Patent: Dec. 1, 2009

(54) SUBSTRATE FOR DISPLAY DEVICE AND DISPLAY DEVICE EQUIPPED THEREWITH

(75) Inventor: Atuyuki Hoshino, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 644 days.

(21) Appl. No.: 11/405,933

(22) Filed: Apr. 18, 2006

(65) Prior Publication Data

US 2006/0187370 A1    Aug. 24, 2006

Related U.S. Application Data

(62) Division of application No. 10/335,964, filed on Jan. 2, 2003, now Pat. No. 7,061,553.

(30) Foreign Application Priority Data

Jan. 4, 2002  (JP) .............................. 2002-000148
Aug. 30, 2002  (JP) .............................. 2002-252662

(51) Int. Cl.
*G02F 1/1343* (2006.01)
(52) U.S. Cl. ....................................................... 349/39
(58) Field of Classification Search .................. 349/39, 349/40, 54, 141
See application file for complete search history.

(56) References Cited

U.S. PATENT DOCUMENTS

| 5,162,901 | A | 11/1992 | Shimada et al. ............... 349/39 |
| 5,260,818 | A | 11/1993 | Wu .............................. 349/55 |
| 5,289,174 | A | 2/1994 | Suzuki ......................... 345/98 |
| 5,418,636 | A | 5/1995 | Kawasaki ................... 349/138 |
| 5,422,293 | A | 6/1995 | Konya ......................... 438/155 |
| 5,648,826 | A | 7/1997 | Song et al. .................... 349/42 |
| 5,686,976 | A | 11/1997 | Nishikawa .................... 349/38 |
| 5,696,566 | A | 12/1997 | Kim et al. ..................... 349/39 |
| 5,852,480 | A | 12/1998 | Yajima et al. ................. 349/40 |
| 5,966,190 | A * | 10/1999 | Dohjo et al. .................. 349/39 |
| 6,268,895 | B1 | 7/2001 | Shimada et al. ............. 349/110 |
| 6,433,765 | B1 | 8/2002 | Fujiwara et al. .............. 345/87 |
| 6,456,350 | B1 | 9/2002 | Ashizawa et al. ........... 349/141 |
| 6,509,939 | B1 * | 1/2003 | Lee et al. ...................... 349/39 |
| 6,621,537 | B1 | 9/2003 | Nakamura et al. |
| 6,833,881 | B2 * | 12/2004 | Lee et al. ...................... 349/39 |

(Continued)

FOREIGN PATENT DOCUMENTS

JP          62-265688          11/1987

(Continued)

*Primary Examiner*—James A Dudek
(74) *Attorney, Agent, or Firm*—Greer, Burns & Crain, Ltd.

(57) ABSTRACT

A display device used as a display unit of electronic equipment and a substrate for the display device, featuring a good display quality. The substrate for the display device comprises a plurality of gate bus lines formed in parallel on the substrate, a plurality of drain bus lines formed in parallel intersecting the plurality of gate bus lines via an insulating film, a plurality of storage capacitor bus lines formed nearly in parallel with the gate bus lines, a plurality of common storage capacitor wirings electrically connected to the plurality of storage capacitor bus lines and formed of the same material as that of the plurality of storage capacitor bus lines, and connection wirings for electrically connecting the plurality of common storage capacitor wirings together.

10 Claims, 12 Drawing Sheets

U.S. PATENT DOCUMENTS

| | | | |
|---|---|---|---|
| 2001/0013919 A1 | 8/2001 | Sato et al. | 349/153 |
| 2005/0094045 A1* | 5/2005 | Chae | 349/40 |

FOREIGN PATENT DOCUMENTS

| | | |
|---|---|---|
| JP | 03-64735 | 3/1991 |
| JP | 03-72321 | 3/1991 |
| JP | 03-072321 | 3/1991 |
| JP | 05-173186 | 7/1993 |
| JP | 05-224239 | 9/1993 |
| JP | 05-273592 | 10/1993 |
| JP | 06-202153 | 7/1994 |
| JP | 07-218930 | 8/1995 |
| JP | 08-136949 | 5/1996 |
| JP | 08-234220 | 9/1996 |
| JP | 09-15646 | 1/1997 |
| JP | 09-090428 | 4/1997 |
| JP | 09-160076 | 6/1997 |
| JP | 09-318936 | 12/1997 |
| JP | 10-20335 | 1/1998 |
| JP | 10-319433 | 12/1998 |
| JP | 2000-111937 | 4/2000 |
| JP | 2000-171822 | 6/2000 |
| JP | 2000-338506 | 12/2000 |
| JP | 2001-228485 | 8/2001 |
| JP | 2002-006339 | 1/2002 |

* cited by examiner

SUBSTRATE FOR DISPLAY DEVICE AND DISPLAY DEVICE EQUIPPED THEREWITH

This is a divisional of application Ser. No. 10/335,964, filed Jan. 2, 2003, now U.S. Pat. No. 7,061,553, issued Jun. 13, 2006.

BACKGROUND OF THE INVENTION

1. Field of the Invention

This invention relates to a display device used as a display unit of electronic devices and to a substrate for the display device.

2. Description of the Related Art

[First Prior Art]

FIG. 13 illustrates a pixel on a TFT substrate 102 for a conventional liquid crystal display device of the active matrix type. On the TFT substrate 102 are formed a plurality of gate bus lines 112 extending in the right-and-left direction in the drawing. On the TFT substrate 102 are further formed a plurality of drain bus lines 116 extending up and down in the drawing intersecting the plurality of gate bus lines 112 via an insulating film that is not shown. Regions defined by the gate bus lines 112 and the drain bus lines 116 serve as pixel regions. On the TFT substrate 102 are formed storage capacitor bus lines 120 traversing nearly the centers of the respective pixel regions and extending in parallel with the gate bus lines 112.

TFTs 117 are formed in the vicinity of the positions where the gate bus lines 112 intersect the drain bus lines 116. Drain electrodes 118 of the TFTs 117 are drawn from the drain bus lines 116, and are so formed that the end portions thereof are positioned on one end side on a channel protection film 119 formed on an operation semiconductor layer (not shown) on the gate bus lines 112. Source electrodes 124 of the TFTs 117 are so formed as to be positioned on the other end side on the channel protection film 119. In this constitution, the gate bus lines 112 just under the channel protection film 119 work as gate electrodes of the TFTs 117.

A pixel electrode 122 is formed on the pixel regions defined by the gate bus lines 112 and drain bus lines 116. The pixel electrode 122 is electrically connected to the source electrode 124 of the TFT 117 through a contact hole 126.

FIG. 14 illustrates, in cross section, the TFT substrate 102 cut along the line A-A in FIG. 13. An insulating film (gate-insulating film) 114 is formed on a glass substrate 110. The drain bus lines 116 are formed on the insulating film 114. A protection film 128 is formed on the whole surface of the substrate on the drain bus lines 116. Pixel electrodes 122 are formed on the protection film 128.

The liquid crystal display device has the TFT substrate 102, an opposite substrate arranged facing the TFT substrate 102, and liquid crystals sealed between the two substrates. A predetermined half-tone voltage is applied to the drain bus lines 116. When the TFT 117 is turned on, the half-tone voltage is applied from the drain electrode 118 to the pixel electrode 122 through the source electrode 124. The intensity of an electric field acting on the liquid crystals of the pixels varies depending upon a potential difference between a common voltage applied to a common electrode formed on the opposite substrate and the half-tone voltage applied to the pixel electrode 122. The direction of inclination of the liquid crystal molecules changes depending upon a change in the intensity of the electric field, whereby the light transmission factor varies and a desired half-tone display is realized.

FIG. 15 illustrates an equivalent circuit of a conventional liquid crystal display device. The constitution of the liquid crystal display device will be described by using FIG. 15 while making reference to FIGS. 13 and 14. Referring to FIG. 15, a liquid crystal capacitance Clc and a storage capacitor Cs are formed in each pixel. The liquid crystal capacitance Clc is of a structure in which a dielectric liquid crystal layer is sandwiched by the pixel electrode 122 and the common electrode on the opposite substrate 104. A common voltage Vcom is applied to the common electrode. The storage capacitor Cs is connected in parallel with the liquid crystal capacitance Clc. The storage capacitor Cs is of a structure in which a dielectric protection film 128 is sandwiched by the storage capacitor bus line 120 and the pixel electrode 122. To increase the capacitance, an intermediate electrode is often provided between the storage capacitor bus line 120 and the pixel electrode 122. The storage capacitor Cs is used for holding the electric charge stored in the pixel electrode 122 while the TFT 117 is being turned off within a display frame period. The plurality of storage capacitor bus lines 120 arranged on the TFT substrate 102 in parallel with the gate bus lines 112, are respectively, electrically connected to a common storage capacitor wiring 130 arranged nearly in parallel with the drain bus lines 116 outside the display region. A predetermined voltage is applied to the storage capacitor bus lines 120 via the common storage capacitor wiring 130. Here, for example, the common voltage Vcom applied to the common electrode of the opposite substrate 104, is applied to the storage capacitor bus lines 120.

FIG. 16 illustrates a drive waveform of when a pixel on the TFT substrate 102 is driven, and wherein the abscissa represents the time and the ordinate represents the voltage level. In FIG. 16, when a predetermined gate pulse voltage Vg is input to the gate electrode of TFT 117 in the pixel causing the TFT 117 to be turned on, the half-tone voltage Vd on the drain bus line 116 to which the drain electrode 118 of the TFT 117 is connected, is written onto the pixel electrode 122 of the pixel.

To prevent the liquid crystals from deteriorating, in general, the half-tone voltage is applied to the liquid crystals relying on a frame inversion drive of which the polarity is inverted with the common voltage Vcom as a center every time when the half-tone voltage is rewritten (i.e., for every display frame). FIG. 16 illustrates a so-called line inversion drive in which the polarity of the half-tone voltage is inverted for every neighboring gate bus line in addition to inverting the frame.

In this frame inversion drive, a voltage obtained by inverting the polarity of the half-tone voltage written in the preceding frame, is written onto the pixel electrode 122 in the next frame. When the half-tone voltage has a large amplitude, therefore, the voltage at the pixel electrode 122 undergoes a great change at the time of writing the half-tone voltage.

When the voltage greatly changes on the pixel electrode 122, the voltage Vc on the side of the storage capacitor bus line 120 constituting the storage capacitor Cs often deviates from the common voltage Vcom. A change in the voltage Vc on the side of the storage capacitor bus line 120 attenuates with a predetermined time constant based on the resistance component and capacitance component in the wiring inclusive of the common storage capacitor wiring 130, and the voltage Vc on the side of the storage capacitor bus line 120 approaches again the common voltage Vcom. When the resistance component and the capacitance component are great, however, the voltage Vc of the storage capacitor bus line 120 becomes no longer capable of returning back to the common voltage Vcom within a period in which TFT 117 is turned on. Should that happen, the desired half-tone voltage Vd is not written but, instead, a potential difference Vp (<Vd) between the half-tone voltage Vd and the voltage Vc on the side of the storage capacitor bus line 120 is written into the pixel electrode 122, deteriorating the quality of display of the liquid crystal display device.

To solve this problem, there has been proposed a method that the common storage capacitor wiring 130 is formed by two layers, i.e., a metal layer forming the gate bus line 112 and a metal layer forming the drain bus line 116, in an attempt to increase the sum of sectional areas of the common storage capacitor wiring 130 and to decrease the resistance component of the common storage capacitor wiring 130.

In order to electrically connect the common storage capacitor wiring 130 formed by the metal layer of the gate bus line 112 to the common storage capacitor wiring 130 formed by the metal layer of the drain bus line 116, however, it is necessary to form a contact hole by perforating the insulating film on the common storage capacitor wiring 130 formed by using the metal layer of the gate bus line 112 and to electrically connect the two common storage capacitor wirings 130 through the contact hole. This makes complex the step of producing the liquid crystal display device, and there is a problem that the cost of production cannot be decreased.

[Second Prior Art]

The liquid crystal display device of the active matrix type is formed by sealing liquid crystals between the opposite substrate on which the common electrode (opposite electrode) is formed over the whole surface thereof and the TFT substrate having pixel electrodes formed for the plurality of respective pixel regions and thin-film transistors (TFTs) connected as switching elements to the respective pixel electrodes. As required, the liquid crystal display device is imparted with a polarizing function by using color filters formed on the opposite substrate.

When the TFT on the TFT substrate is turned on, a predetermined potential is written for each pixel electrode, and the voltage applied to the liquid crystal layer is controlled for each pixel region. The voltage applied to the liquid crystal layer must be maintained until the next frame even when the TFT is turned off. However, the potential of the pixel electrode varies within a frame period due to parasitic capacitance formed in the TFT and leakage current between the pixel electrode and the common electrode. Therefore, each pixel region is provided with a storage capacitor Cs which is connected in parallel with the pixel capacitance Clc and which uses the pixel electrode as one electrode. The storage capacitor suppresses the variation in the potential of the pixel electrode, and the voltage applied to the liquid crystal layer is maintained for one frame period.

The liquid crystal display devices can be grouped into those of the Cs-on-gate type in which the gate electrodes of the neighboring pixels are used as the other electrodes of the storage capacitors and the capacitance is formed during the off state when no voltage is being applied to the gate electrodes, and those of the independent Cs type in which the storage capacitor bus lines that are independently formed are used as the other electrodes. The liquid crystal display device of the Cs-on-gate type requires no storage capacitor bus line, and features a higher aperture ratio of pixels than that of the liquid crystal display device of the independent Cs type.

Japanese Laid-Open Patent Publication No. 202153/1994 discloses a technology as described below in an attempt to simplify the process for manufacturing the liquid crystal display device and the steps of production. On the TFT substrate of the liquid crystal display device, there are formed gate electrodes of TFTs, gate bus lines and storage capacitor bus lines by using a first electrically conducting material. An insulating film is formed on the gate electrodes, gate bus lines and storage capacitor bus lines. On the insulating film, there are formed source/drain electrodes of TFTs and drain bus lines by using a second electrically conducting material. On the insulating film are further formed storage capacitor electrodes (intermediate electrodes) for forming storage capacitors relative to the storage capacitor bus lines by using the second electrically conducting material. A protection film is formed on the source/drain electrodes, drain bus lines and storage capacitor electrodes. Contact holes are formed by perforating the protection film on the source electrodes, storage capacitor electrodes and drain bus line terminals at the ends of the drain bus lines. Further, contact holes are formed by perforating the protection film and the insulating film on the gate bus line terminals at the ends of the gate bus lines and on the storage capacitor bus line terminals (hereinafter also simply referred to as external connection terminals) at the ends of the storage capacitor bus lines simultaneously with the formation of the above contact holes by using the same photomask. Then, a pixel electrode made of a third electrically conducting material is formed for each of the pixels. The pixel electrode is electrically connected to the source electrode and to the storage capacitor electrode through the contact holes.

In the liquid crystal display device of the independent Cs type, there is formed a common storage capacitor wiring for electrically connecting the plurality of storage capacitor bus lines to maintain the storage capacitor bus lines at the same potential. A predetermined voltage is applied to the common storage capacitor wiring through an external connection terminal. Japanese Laid-Open Patent Publication 265688/1987 discloses a common storage capacitor wiring by bundling the storage capacitor bus lines. Japanese Laid-Open Patent Publication 72321/1991 discloses the constitution of a common storage capacitor wiring for forming an additional capacitance relative to the gate bus line outside the display region. Japanese Laid-Open Patent Publication 160076/1997 discloses the constitution for electrically connecting the storage capacitor bus lines to the common storage capacitor wiring through the contact holes formed on the storage capacitor bus lines and on the common storage capacitor wiring, and through connection wirings formed between the two contact holes. Japanese Laid-Open Patent Publication 218930/1995 discloses the constitution provided with TFTs of the normal stagger type and in which the storage capacitor bus lines are formed by using the same material as the one forming the light shield film instead of using the same material as the one forming the gate electrodes.

In the liquid crystal display device of the independent Cs type, the common electrode is electrically connected to the storage capacitor bus lines through transfer portions formed outside the display region to equalize the potential between the common electrode formed on the opposite substrate and the storage capacitor bus lines. Japanese Laid-Open Patent Publication 234220/1996 discloses an example of arranging a plurality of transfer portions along the outer circumference of the substrate. Japanese Laid-Open Patent Publication 136949/1996 discloses the constitution equipped with TFTs of the normal stagger type and forming the connection terminals of the transfer portions by using the same material as the one forming the light shield film instead of using the same material as the one forming the gate electrode. Japanese Laid-Open Patent Publication 15646/1997 discloses the constitution of connecting the common storage capacitor wiring to the common electrode through an additional resistor.

FIG. 17 illustrates the constitution of a conventional substrate for display devices. On the display region of the TFT substrate 102 surrounded by a broken line as shown in FIG. 17, there are formed a plurality of gate bus lines 112 (four lines in FIG. 17) in parallel with each other and extending in the right-and-left direction in the drawing. Gate bus line terminals 156 are formed at the ends of the respective gate bus lines 112 on the left in the drawing.

On the display region of the TFT substrate 102, further, there are formed a plurality of storage capacitor bus lines 120 (four lines in FIG. 17) in parallel with the gate bus lines 112 by using the same material as the one forming the gate bus lines 112. At the ends of the storage capacitor bus lines 120 on the right in the drawing, there is formed a common storage capacitor wiring 160 by using the same material as the one forming the gate bus lines 112 and the storage capacitor bus lines 120, and extending in the up-and-down direction in the drawing. The common storage capacitor wiring 160 is connected to the plurality of storage capacitor bus lines 120. Though not illustrated, on the display region are formed a plurality of drain bus lines in parallel with each other and extending in the up-and-down direction in the drawing, intersecting the gate bus lines 112 and the storage capacitor bus lines 120 via an insulating film.

External connection terminals 142 are formed on the TFT substrate 102 at left upper, right upper and right lower three ends in the drawing. The external connection terminals 142 are connected to the storage capacitor bus lines 120 or to the common storage capacitor wiring 160. A predetermined voltage is applied from an external side to the storage capacitor bus lines 120 through the external connection terminals 142.

In the vicinity of the common storage capacitor wiring 160, there are arranged transfer-forming regions 144 that will be connected to the common electrode on the opposite substrate through the transfer portions when the substrate is stuck to the opposite substrate (not shown). On the transfer-forming regions 144 are formed connection pads for example, by using the same material as the one forming the gate bus lines 112. The connection pads are electrically connected to the common storage capacitor wiring 160. In the constitution shown in FIG. 17, however, a problem arouses in regard to a delay of the signals at the ends of the storage capacitor bus lines 120 which are not connected to the external connection terminals 142.

FIG. 18 illustrates the constitution of another conventional substrate for display devices. On the TFT substrate 102 as shown in FIG. 18, there are formed a plurality of gate bus lines 112 (four lines in FIG. 18) in parallel with each other and extending in the right-and-left direction in the drawing. Gate bus line terminals 156 are respectively formed at both ends of the gate bus lines 112.

On the TFT substrate 102, further, there are formed a plurality of storage capacitor bus lines 120 (four lines in FIG. 18) in parallel with the gate bus lines 112 by using the same material as the one forming the gate bus line 112. At the ends of the storage capacitor bus lines 120 on the right in the drawing, there is formed a common storage capacitor wiring 160 by using an electrically conducting material different from the material forming the gate bus lines 120, and extending in the up-and-down direction in the drawing. The common storage capacitor wiring 160 is connected to the plurality of storage capacitor bus lines 120. At the ends of the storage capacitor bus line 120 on the left in the drawing, there is formed a common storage capacitor wiring 161 by using an electrically conducting material different from the material forming the storage capacitor bus lines 120 and extending in the up-and-down direction in the drawing. The common storage capacitor wiring 161 is connected to a plurality of storage capacitor bus lines 120.

In this constitution, the common storage capacitor wirings 160 and 161 are formed on both sides of the storage capacitor bus lines 120 and are applied with a predetermined voltage through the external connection terminals. As compared to the constitution illustrated in FIG. 17, the additional capacitance C and the electric resistance R can be nearly halved, suppressing a delay of signals through the storage capacitor bus lines 120. According to this constitution, however, it is necessary to newly form the common storage capacitor wirings 160 and 161 of an electrically conducting material different from the material forming the storage capacitor bus lines 120, arousing a problem of an increase in the number of production steps.

In recent years, the length of the storage capacitor bus lines 120 is increasing and the area of the common electrode which is a surface electrode is increasing, accompanied by an increase in the size of the display screen of the liquid crystal display devices. This, however, is accompanied by a further increase in the electric resistance in the storage capacitor bus lines 120 and in the common electrode. To decrease the electric resistance of the storage capacitor bus lines 120, the width of the wiring must be increased or the thickness thereof (film thickness) must be increased. However, an increase in the width of the storage capacitor bus lines 120 results in a decrease in the numerical aperture. Besides, limitation is imposed on increasing the thickness of the storage capacitor bus lines 120 and an increased period of time is required for forming a film from which the storage capacitor bus lines are formed in the step of production.

Further, as the pixels of the liquid crystal display device become highly fine, the number of intersection regions increases for enabling the storage capacitor bus lines 120 to intersect the drain bus lines via an insulating film. This results in a further increase in the additional capacitance of the storage capacitor bus lines 120.

As the electric resistance and additional capacitance of the storage capacitor bus line 120 increase, there occurs a delay of the signals for the compensation of the pixel potential based on a CR time constant determined by the product of the electric resistance and the additional capacitance. A delay of the signals causes a decrease in the quality of display of the liquid crystal display device.

As the pixels become highly fine, furthermore, the number of the gate bus lines also increases. If the frame period does not change, therefore, the time for writing the pixel potential assigned to each gate bus line becomes short. Therefore, there is further a problem of delays of the signals.

In the liquid crystal display device of the Cs-on-gate type which forms the storage capacitor only when the gate electrode has not been driven, in particular, the CR time constant required for the gate bus lines becomes more strict than the CR time constant required for the storage capacitor bus lines and the gate bus lines of the liquid crystal display device of the independent Cs type. Therefore, a highly fine liquid crystal display device of a large screen is constructed in the independent Cs type. In the device of the independent Cs type, too, it is desired to further decrease the resistance to satisfy the resistance required in the vicinity of the signal input terminals of the bus lines and at the ends of the bus lines distant from the input terminals. As for the common electrode, too, it is desired to further decrease the resistance to satisfy the resistance required in the vicinity of the signal input terminals and at the ends distant from the input terminals.

When the resistance cannot be decreased to a sufficient degree, a voltage different from the desired voltage is applied across the pixel electrode and the common electrode. In the liquid crystal display device of the normally white mode, therefore, there arouses a problem in that display unevenness (brightness inclination) occurs causing the pixels connected to the ends of the bus lines to appear more white than a desired half-tone. In the liquid crystal display device of the normally black mode, similarly, there arouses a problem in that display unevenness occurs causing the pixels connected to the ends of the bus lines to appear more black than a desired half-tone. These problems related to the display unevenness cannot be solved relying simply upon the storage capacitor bus lines or the common electrode alone.

SUMMARY OF THE INVENTION

It is an object of this invention to provide a substrate for a display device capable of obtaining a good display quality without increasing the number of production steps while suppressing the cost of production, and a display device equipped therewith.

The above object is accomplished by a substrate for a display device, comprising:

a base substrate stuck to an opposite substrate arranged in an opposing manner;

a plurality of gate bus lines formed in parallel on the base substrate;

a plurality of drain bus lines formed in parallel intersecting the plurality of gate bus lines via an insulating film;

a plurality of storage capacitor bus lines formed nearly in parallel with the gate bus lines;

a plurality of common storage capacitor wirings electrically connected to the plurality of storage capacitor bus lines and formed of the same material as that of the plurality of storage capacitor bus lines; and connection wirings for electrically connecting the plurality of common storage capacitor wirings.

DESCRIPTION OF THE PREFERRED EMBODIMENTS

First Embodiment

Figure 1:
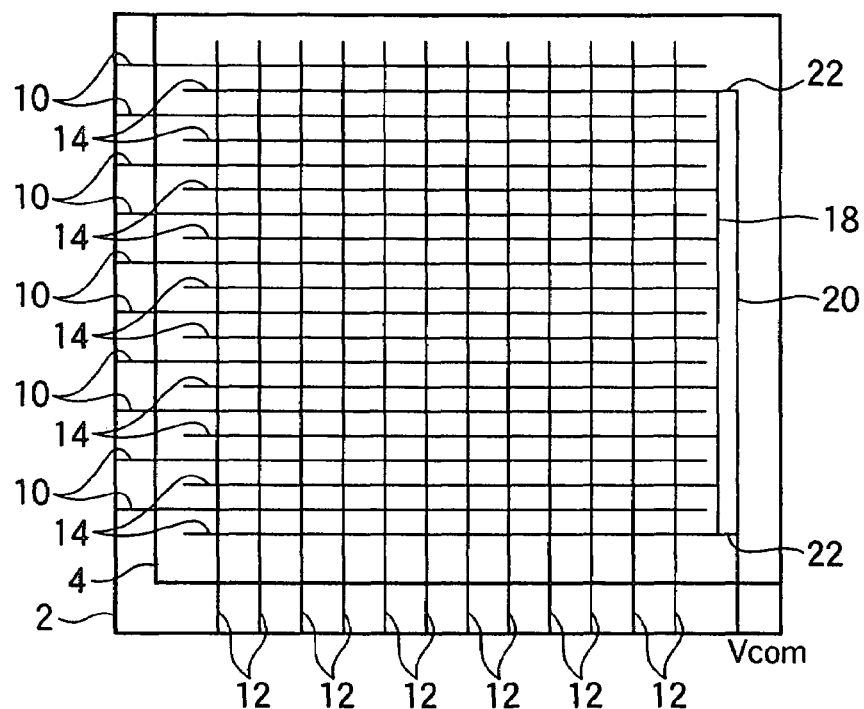
FIG. 1 is a diagram illustrating a substrate for a liquid crystal display device and a liquid crystal display device equipped therewith according to a first embodiment of the invention.

Described below with reference to FIG. 1 are a substrate for a display device and a display device equipped therewith according to a first embodiment of the invention. FIG. 1 illustrates the constitution of the liquid crystal display device of the embodiment as viewed from a direction perpendicular to the substrate. Referring to FIG. 1, the liquid crystal display device is constituted by a TFT substrate (base substrate) 2, an opposite substrate 4 arranged opposed to the TFT substrate 2, and liquid crystals (not shown) sealed between the two substrates 2 and 4. The two substrates 2 and 4 are stuck together via a sealing member (not shown in FIG. 1) applied to the circumference of either one substrate. On the TFT substrate 2 are formed a plurality of gate bus lines 10 extending in the right-and-left direction in the drawing. A plurality of drain bus lines 12 are formed extending in the up-and-down direction in the drawing intersecting the gate bus lines 10 via an insulating film that is not shown. Though not illustrated, TFTs are formed close to the positions where the gate bus lines 10 and the drain bus lines 12 intersect each other.

On the TFT substrate 2 are further formed a plurality of storage capacitor bus lines 14 extending in parallel with the gate bus lines 10. The ends (right ends in the drawing) of the storage capacitor bus lines 14 are electrically connected to a common storage capacitor wiring 18. The common storage capacitor wiring 18 is formed extending in the up-and-down direction in the drawing. One end of the common storage capacitor wiring 18 is connected to the right end of the storage capacitor bus line 14 at the upper end in the drawing, and the other end thereof is connected to the right end of the storage capacitor bus line 14 at the lower end in the drawing. On the right of the common storage capacitor wiring 18 in the drawing, there is formed a common storage capacitor wiring 20 extending nearly in parallel with the common storage capacitor wiring 18. For example, a common voltage Vcom is applied to the common storage capacitor wiring 20. The common storage capacitor wiring 18 and the common storage capacitor wiring 20 are electrically connected together through two connection wirings 22 connected to both ends of the common storage capacitor wiring 18. The common storage capacitor wirings 18, 20 and the connection wirings 22 are formed of a metal layer that is forming the gate bus lines 10.

In this embodiment, the two common storage capacitor wirings 18 and 20 are formed of the metal layer that is forming the gate bus lines 10. Therefore, the sum of sectional areas of the common storage capacitor wirings 18 and 20 increase to decrease the resistance component of the common storage capacitor wirings 18 and 20. Therefore, the voltage Vc of the storage capacitor bus lines 14 can return back to the common voltage Vcom with in a period in which the TFTs are turned on. Accordingly, a desired half-tone voltage is applied to the respective pixels to improve the display quality of the liquid crystal display device.

In this embodiment, further, the two common storage capacitor wirings 18 and 20 are both formed of the metal layer that is forming the gate bus lines 10, and are electrically connected together through the connection wirings 22 formed of the metal layer that is forming the gate bus lines 10. Therefore, there is no need of forming contact holes in the insulating film for connecting the two common storage capacitor wirings 18 and 20 together. This helps simplify the steps for producing the liquid crystal display devices.

Second Embodiment

Figure 2:
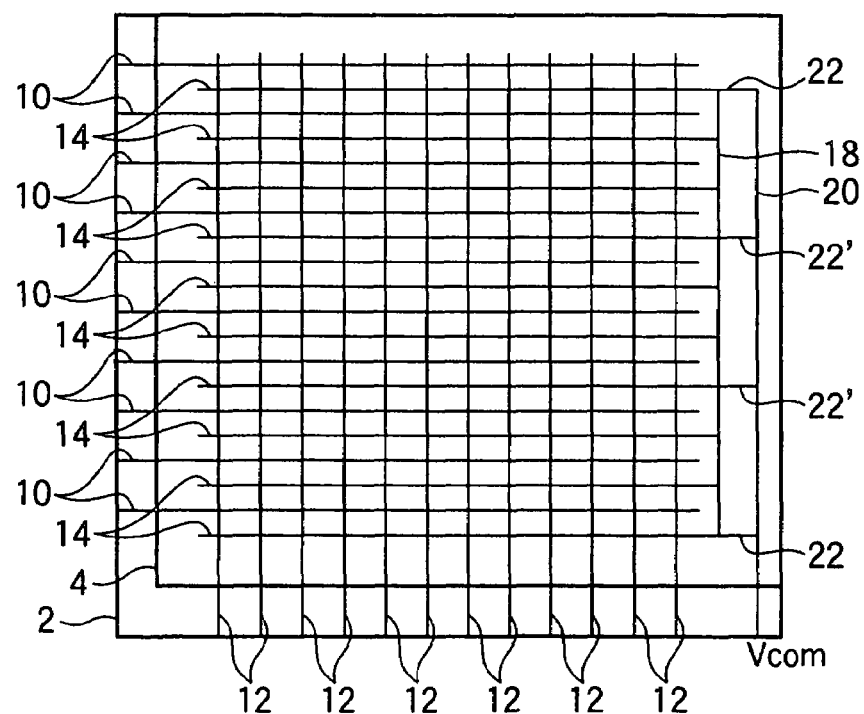
FIG. 2 is a diagram illustrating the substrate for a liquid crystal display device and the liquid crystal display device equipped therewith according to a second embodiment of the invention.

Described below next with reference to FIG. 2 are a substrate for a display device and a display device equipped therewith according to a second embodiment of the invention. In this embodiment as shown in FIG. 2, the common storage capacitor wirings 18 and 20 are electrically connected together through two connection wirings 22 connected to both ends of the common storage capacitor wiring 18 and through two connection wirings 22' formed respectively at positions dividing the distance between two connection wirings 22 into nearly one-third.

In this embodiment, there are formed two common storage capacitor wirings 18 and 20 similarly to the first embodiment. Therefore, the sum of sectional areas of the common storage capacitor wirings 18 and 20 increases and the resistance component decreases in the common storage capacitor wirings 18 and 20. Therefore, the voltage Vc of the storage capacitor bus lines 14 can return back to the common voltage Vcom within the period in which the TFTs are turned on, making it possible to apply a desired half-tone voltage to the respective pixels and, hence, to improve the display quality of the liquid crystal display device.

In this embodiment, further, the two common storage capacitor wirings 18 and 20 are electrically connected together through two connection wirings 22 and two connection wirings 22' formed respectively at positions dividing the distance between the two connection wirings 22 into nearly one-third. It is therefore allowed to further decrease the resistance component of the common storage capacitor wirings 18 and 20 for more pixels as compared to that of the first embodiment. This makes it possible to apply a desired half-tone voltage to a further increased number of pixels and, hence, to improve the display quality of the liquid crystal display device.

In this embodiment, further, the two common storage capacitor wirings 18 and 20 are both formed of the metal layer forming the gate bus lines 10 similarly to the first embodiment, and are electrically connected together through the connection wirings 22, 22' formed of the metal layer that is forming the gate bus lines 10. Therefore, the two common storage capacitor wirings 18 and 20 are connected together without the need of forming contact holes in the insulating film. This helps simplify the steps of producing the liquid crystal display device.

Third Embodiment

Figure 3:
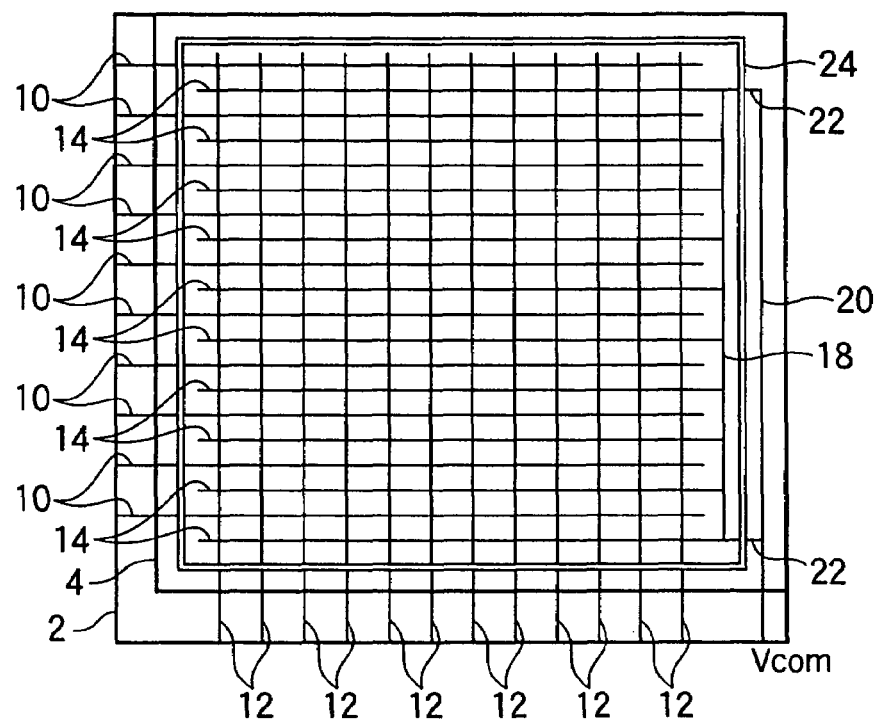
FIG. 3 is a diagram illustrating the substrate for a liquid crystal display device and the liquid crystal display device equipped therewith according to a third embodiment of the invention.

Described below next with reference to FIG. 3 are a substrate for a display device and a display device equipped therewith according to a third embodiment of the invention. In this embodiment as shown in FIG. 3, a sealing member 24 is applied between the common storage capacitor wiring 18 and the common storage capacitor wiring 20, the common storage capacitor wiring 20 being arranged on the outer side of the sealing member 24. The outer side of the sealing member 24 is an empty region where no other wiring is formed. The connection wirings 22 are arranged intersecting the sealing member 24 to electrically connect the common storage capacitor wirings 18 and 20 together.

In this embodiment, there are formed two common storage capacitor wirings 18 and 20 similarly to the first and second embodiments. Therefore, the sum of sectional areas of the common storage capacitor wirings 18 and 20 increases and the resistance component decreases in the common storage capacitor wirings 18 and 20. Therefore, the voltage Vc of the storage capacitor bus lines 14 can return back to the common voltage Vcom within the period in which the TFTs are turned on, making it possible to apply a desired half-tone voltage to the respective pixels and, hence, to improve the display quality of the liquid crystal display device.

In this embodiment, further, the two common storage capacitor wirings 18 and 20 are both formed of the metal layer forming the gate bus lines 10 similarly to the first and second embodiments, and are electrically connected together through the connection wirings 22 formed of the metal layer that is forming the gate bus lines 10. Therefore, the two common storage capacitor wirings 18 and 20 are connected together without the need of forming contact holes in the insulating film. This helps simplify the steps of producing the liquid crystal display device.

In this embodiment, further, the common storage capacitor wiring 20 is formed on the empty region on the outer side of the sealing member 24. This makes it possible to decrease the number of the wirings on the inside of the sealing member 24 and, hence, to increase the display region of the liquid crystal display device. Further, since the sealing member 24 is applied between the common storage capacitor wiring 18 and the common storage capacitor wiring 20, the height of the sealing member beyond the substrate surface at the time when the sealing member 24 is applied, becomes nearly the same as that of other regions. Hence, the cell thickness does not vary between the central portion of the display region and the ends of the display region, and no display unevenness occurs.

Fourth Embodiment

Figure 4:
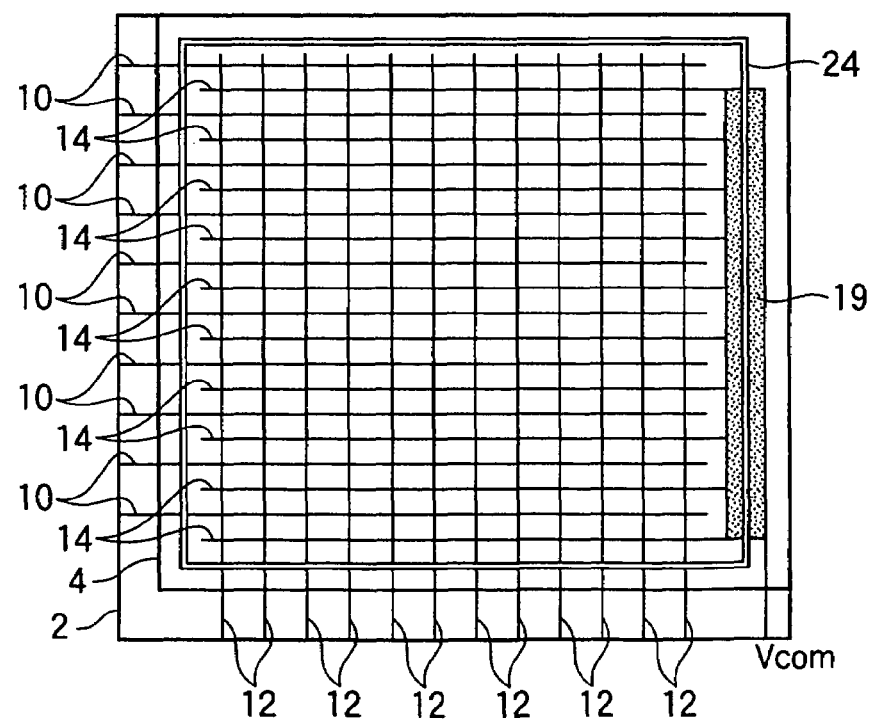
FIG. 4 is a diagram illustrating the substrate for a liquid crystal display device and the liquid crystal display device equipped therewith according to a fourth embodiment of the invention.

Described below next with reference to FIG. 4 are a substrate for a display device and a display device equipped therewith according to a fourth embodiment of the invention. In this embodiment as shown in FIG. 4 different from the first to the third embodiments, a common storage capacitor wiring 19 is formed extending up and down in the drawing. The common storage capacitor wiring 19 is electrically connected to the ends (right ends in the drawing) of the storage capacitor bus lines 14. Further, the common storage capacitor wiring 19 is formed maintaining a width (right-and-left direction in the drawing) larger than that of the region on where the sealing member 24 is applied. The sealing member 24 is applied within the width of the common storage capacitor wiring 19.

In this embodiment, the common storage capacitor wiring 19 is formed maintaining a relatively large width. Therefore, the sectional area of the common storage capacitor wiring 19 is great and the resistance component is small in the common storage capacitor wiring 19. Therefore, the voltage Vc of the storage capacitor bus lines 14 can return back to the common voltage Vcom within the period in which the TFTs are turned on, making it possible to apply a desired half-tone voltage to the respective pixels and, hence, to improve the display quality of the liquid crystal display device.

Fifth Embodiment

Figure 5:
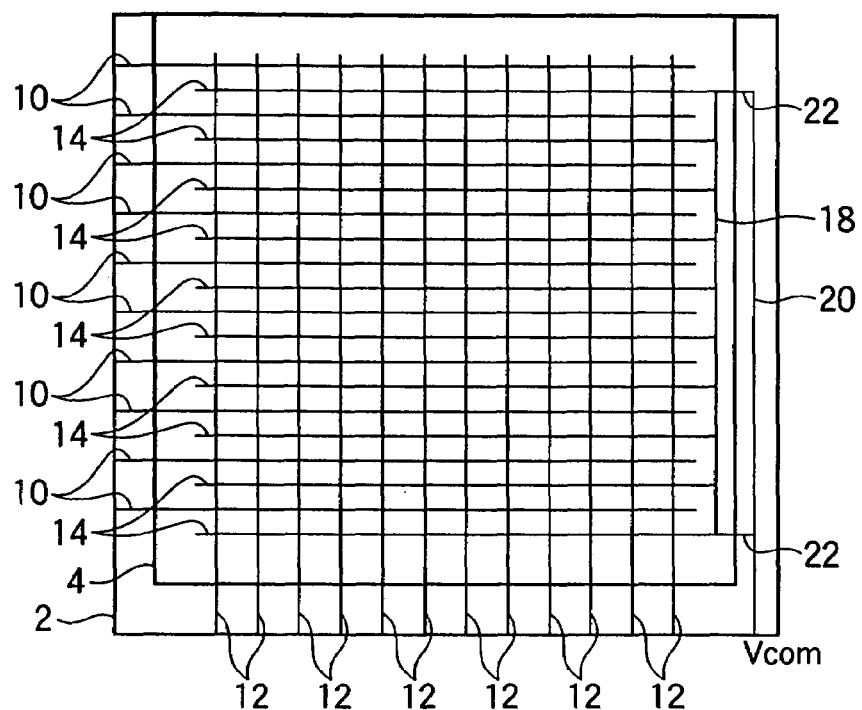
FIG. 5 is a diagram illustrating the substrate for a liquid crystal display device and the liquid crystal display device equipped therewith according to a fifth embodiment of the invention.

Described below next with reference to FIG. 5 are a substrate for a display device and a display device equipped therewith according to a fifth embodiment of the invention. In this embodiment as shown in FIG. 5, the TFT substrate 2 stuck to the opposite substrate 4 has regions that are exposed along the right, lower and left three end sides in the drawing as viewed from the side of the opposite substrate 4 in a direction perpendicular to the substrate surface. When the liquid crystal display panel comprising the two substrates 2 and 4 stuck together is incorporated in a housing which is not shown, therefore, it can be supported with the three end sides. The common storage capacitor wiring 20 is formed on the outer side of the end sides of the opposite substrate 4 as viewed from a direction perpendicular to the substrate surface.

In this embodiment, there are formed two common storage capacitor wirings 18 and 20 similarly to the first to third embodiments. Therefore, the sum of sectional areas of the common storage capacitor wirings 18 and 20 increases and the resistance component decreases in the common storage capacitor wirings 18 and 20. Therefore, the voltage Vc of the storage capacitor bus lines 14 can return back to the common voltage Vcom within the period in which the TFTs are turned on, making it possible to apply a desired half-tone voltage to the pixels and, hence, to improve the display quality of the liquid crystal display device.

In this embodiment, further, the two common storage capacitor wirings 18 and 20 are both formed of the metal layer forming the gate bus lines 10 similarly to the first to third embodiments, and are electrically connected together through the connection wirings 22 formed of the metal layer that is forming the gate bus lines 10. Therefore, the two common storage capacitor wirings 18 and 20 are connected together without the need of forming contact holes in the insulating film. This helps simplify the steps of producing the liquid crystal display device.

In this embodiment, further, the common storage capacitor wiring 20 is formed on the outer side of the four end sides of the opposite substrate 4 as viewed from a direction perpendicular to the substrate surface. Similarly to the third embodiment, therefore, it is allowed to decrease the number of wirings on the inside of the sealing member 24 and, hence, to increase the display region of the liquid crystal display device.

Sixth Embodiment

Figure 6:
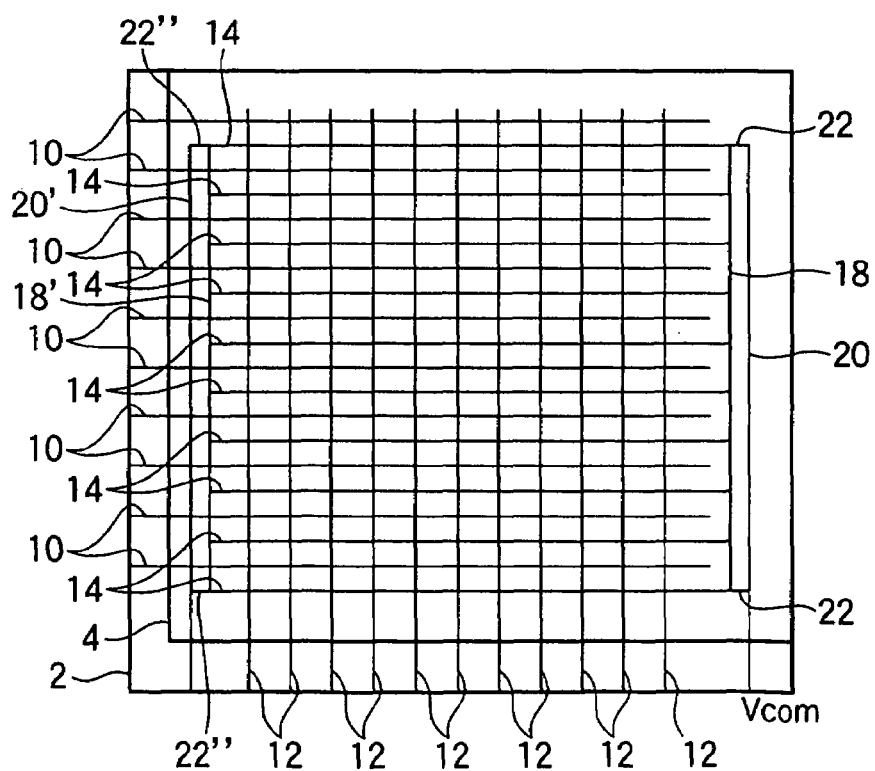
FIG. 6 is a diagram illustrating the substrate for a liquid crystal display device and the liquid crystal display device equipped therewith according to a sixth embodiment of the invention.

Described below next with reference to FIG. 6 are a substrate for a display device and a display device equipped therewith according to a sixth embodiment of the invention. In this embodiment as shown in FIG. 6, there are formed common storage capacitor wirings 18 and 20 at the right end of the TFT substrate 2 so as to be connected to the ends on one side of the storage capacitor bus lines 14. Further, a common storage capacitor wiring 18' is formed at the left end of the TFT substrate 2 extending up and down in the drawing so as to be connected to the ends on the other side of the storage capacitor bus lines 14. On the left of the common storage capacitor wiring 18' in the drawing, there is formed a common storage capacitor wiring 20' extending nearly in parallel with the common storage capacitor wiring 18'. The common storage capacitor wiring 20' is applied with, for example, the common voltage Vcom. The common storage capacitor wiring 18' and the common storage capacitor wiring 20' are electrically connected together through two connection wirings 22" connected to both ends of the common storage capacitor wiring 18'. The common storage capacitor wirings 18', 20' and the connection wirings 22" are formed of the metal layer that is forming the drain bus lines 12.

This embodiment exhibits the same effects as those of the first embodiment. Besides, since the common storage capacitor wirings 18, 20, 18' and 20' are connected to the ends on both sides of the storage capacitor bus lines 14, it is allowed to flow an electric current from the ends on both sides of the storage capacitor bus lines 14. Therefore, an increased electric current flows into the storage capacitor bus lines 14 through the common storage capacitor wirings 18 and 20. It is therefore made possible to suppress variation in the voltage Vc on the storage capacitor bus lines 14 of pixels and to improve the display quality of the liquid crystal display device.

Seventh Embodiment

Figure 7:
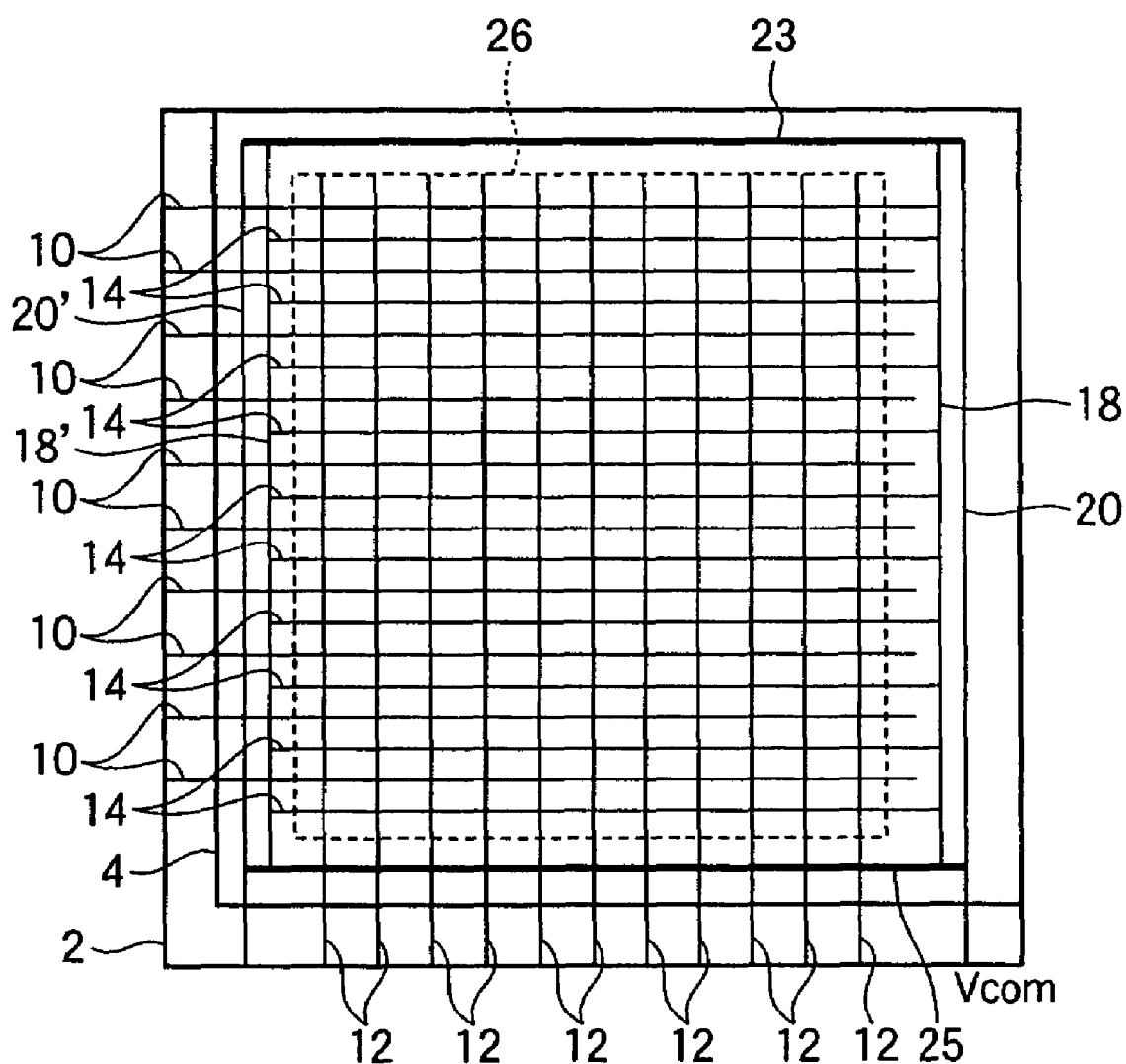
FIG. 7 is a diagram illustrating the substrate for a liquid crystal display device and the liquid crystal display device equipped therewith according to a seventh embodiment of the invention.

Described below next with reference to FIG. 7 are a substrate for a display device and a display device equipped therewith according to a seventh embodiment of the invention. In this embodiment as shown in FIG. 7, there are formed common storage capacitor wirings 18 and 20 at the right end of the TFT substrate 2 so as to be connected to the ends on one side of the storage capacitor bus lines 14. Further, common storage capacitor wiring 18' and 20' are formed at the left end of the TFT substrate 2 so as to be connected to the ends on the other side of the storage capacitor bus lines 14. On the upper part of the display region 26 in the drawing, there is formed a connection wiring (second connection wiring) 23 so as to be connected to the ends on one side (upper ends in the drawing) of the common storage capacitor wirings 18, 20, 18' and 20'. On the lower part of the display region 26 in the drawing, there is formed a connection wiring (second connection wiring) 25 so as to be connected to the ends on the other side (lower ends in the drawing) of the common storage capacitor wirings 18, 20, 18' and 20'. The connection wirings 23 and 25 are formed having a width larger than that of the storage capacitor bus lines 14. Therefore, the connection wirings 23 and 25 have resistances smaller than that of the storage capacitor bus lines 14.

This embodiment exhibits the same effects as those of the sixth embodiment. Besides, the common storage capacitor wirings 18, 20 and the common storage capacitor wirings 18', 20' are connected together through the connection wirings 23 and 25 having a resistance smaller than that of the storage capacitor bus line 14. Therefore, this embodiment exhibits the same effect as that of the sixth embodiment and enables the voltage Vc of the storage capacitor bus lines 14 to more uniformly return back to the common potential Vcom. It is therefore made possible to apply a desired half-tone voltage to the pixels and to improve the display quality of the liquid crystal display device.

Eighth Embodiment

Described below next with reference to FIGS. 8 to 12 are a substrate for a display device and a display device equipped therewith according to an eighth embodiment of the invention. Described below, first, is the constitution of the liquid crystal display device which serves as a prerequisite of this embodiment. A driver IC circuit is connected to the liquid crystal display device by TAB (tape automated bonding) mounting. It is desired that the TAB mounting is effected at the number of places which is as small as possible from the standpoint of decreasing the cost of production of the liquid crystal display device, simplifying the steps of production and improving the reliability. Namely, it is desired to employ a one-side mounting (one-side take out) which is amounting system permitting the drive signals to be input to the gate bus lines and to the drain bus lines from the ends on one side thereof.

As for the storage capacitor bus lines and common electrodes, on the other hand, it is desired that a predetermined voltage is applied thereto from both end sides of the substrate. In the structure in which the predetermined voltage is applied from the one end side of the substrate, the region where the voltage signal delays most is on the other end side distant from the input terminals. In the structure in which the predetermined voltage is applied from both end sides of the substrate, on the other hand, the region where the voltage signal delay is the most problematic is the central portion of the display region. That is, in the structure in which the voltage is applied from both end sides of the substrate, the distance from the input terminals to the region where the signal delay is the most problematic becomes nearly one-half and, hence, the electric resistance R and the additional capacitance C become about one-half, respectively, and the time constant becomes about one-fourth.

Figure 8:
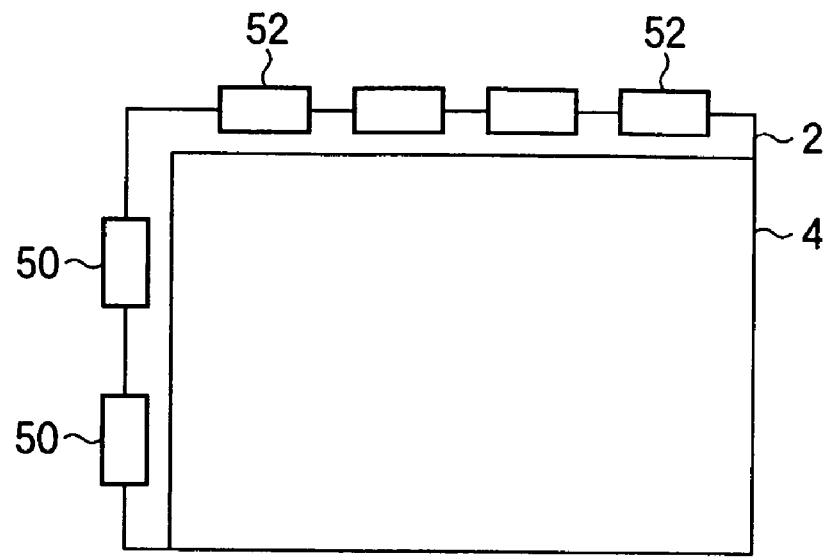
FIG. 8 is a diagram illustrating the constitution of the liquid crystal display device according to an eighth embodiment of the invention.

FIG. 8 is a diagram schematically illustrating the constitution of the liquid crystal display device according to this embodiment. Referring to FIG. 8, the liquid crystal display device includes a TFT substrate 2 on which TFTs and pixel electrodes are formed for each of the pixel regions, an opposite substrate 4 arranged facing the TFT substrate 2 and is forming color filters (CF), and liquid crystals (not shown) sealed between the two substrates 2 nd 4. If viewed from the side of the opposite substrate 4, the surfaces of the TFT substrate 2 in the vicinity of the neighboring two sides are exposed. Of the exposed regions of the TFT substrate 2, there are mounted on the left side of the drawing a plurality of TCPs (tape carrier packages) 50 (two of them are shown in FIG. 8) mounting driver ICs for driving the gate bus lines. Of the exposed regions of the TFT substrate 2, further, there are mounted on the upper side of the drawing a plurality of TCPs 52 (four of them are shown in FIG. 8) mounting driver ICs for driving the drain bus lines. The plurality of TCPs 50, 52 are connected to peripheral circuit boards (not shown).

Figure 9:
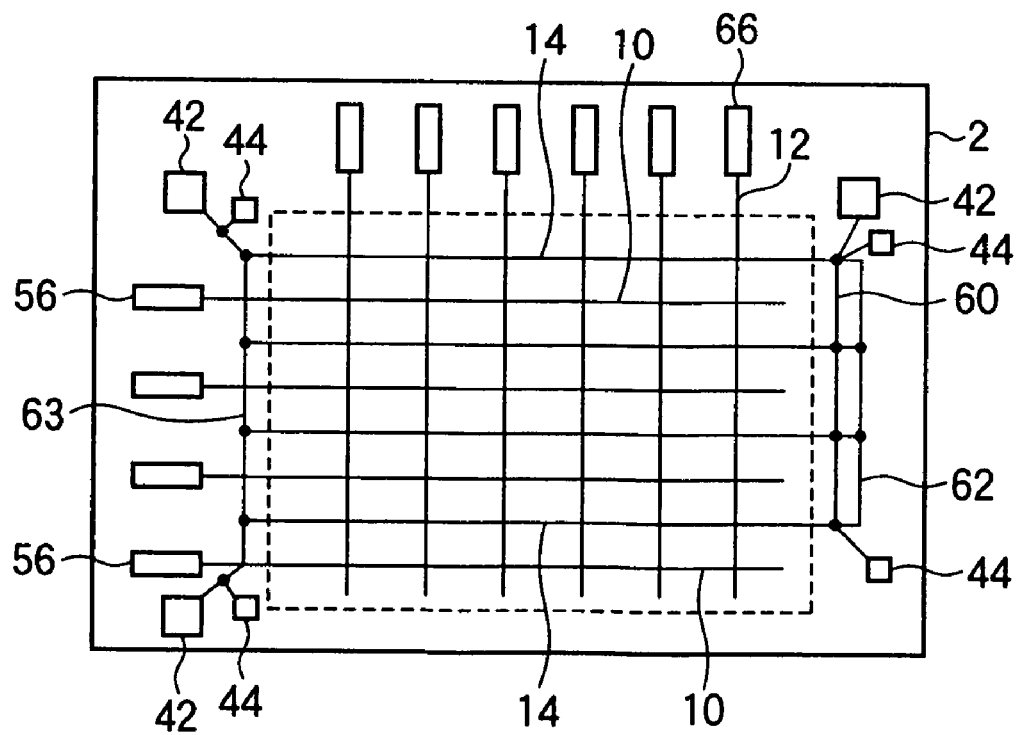
FIG. 9 is a diagram illustrating the constitution of the substrate for the liquid crystal display device according to the eighth embodiment of the invention.

FIG. 9 is a diagram illustrating the constitution of the TFT substrate according to this embodiment. Referring to FIG. 9, a plurality of gate bus lines 10 (four lines are shown in FIG. 9) are formed on the TFT substrate 2 extending in the right-and-left direction in parallel with each other. Gate bus line terminals 56 are formed at the ends on the left in the drawing of the gate bus lines 10.

On the TFT substrate 2 are further formed a plurality of storage capacitor bus lines 14 (four lines are shown in FIG. 9) in parallel with the gate bus lines 10 and being formed of a material same as the material forming the gate bus lines 10. There are further formed a plurality of drain bus lines 12 (six lines are shown in FIG. 9) intersecting the gate bus lines 10 and the storage capacitor bus lines 14 via an insulating film. Drain bus line terminals 66 are formed at the ends on the upper side in the drawing of the drain bus lines 12.

At the ends of the storage capacitor bus lines 14 on the right in the drawing, there is formed a common storage capacitor wiring 60 (common wiring) extending up and down in the drawing and being formed of the same material as the one forming the gate bus lines 10 and the storage capacitor bus lines 14. The common storage capacitor wiring 60 is connected to the plurality of storage capacitor bus lines 14. At the ends of the storage capacitor bus lines 14 on the right in the drawing, there is formed a common storage capacitor wiring 62 formed of the same material as the one forming the drain bus lines 12. The common storage capacitor wiring 62 is electrically connected to the plurality of storage capacitor bus lines 14. At the ends of the storage capacitor bus lines 14 on the left in the drawing, there is formed a common storage capacitor wiring 63 being formed of the same material as the one forming the drain bus lines 12. The common storage capacitor wiring 63 is electrically connected to the plurality of storage capacitor bus lines 14.

External connection terminals 42 for applying a predetermined voltage to the storage capacitor bus lines are formed at the right upper, left upper and left lower three end portions of the TFT substrate 2 in the drawing. The external connection terminals 42 are electrically connected to the common storage capacitor wiring 60 or 63. The external connection terminals 42 are connected to external units through the TCPs 50 and 52 shown in FIG. 8.

Transfer-forming regions 44 are arranged at four corner portions of the TFT substrate 2 so as to be electrically connected, via transfer portions, to the common electrodes formed on the opposite substrate when the TFT substrate is stuck to the opposite substrate. On the transfer-forming regions 44, there are formed connection pads constituted by a lower electrode formed of the same material as the one forming, for example, storage capacitor bus lines 14 and an upper electrode formed of the same material as the one forming the pixel electrodes. The connection pads are electrically connected to the common storage capacitor wirings 60, 62 and 63. It is desired that the transfer-forming regions 44 are arranged in the vicinity of at least a set of diagonal lines of the TFT substrate 2 or in the vicinity of at least both ends of a side along a direction in which the gate bus lines 10 are extending on the TFT substrate 2. Further, a number of transfer-forming regions 44 may be nearly evenly arranged in the surrounding, of for example, the display region.

Figure 10:
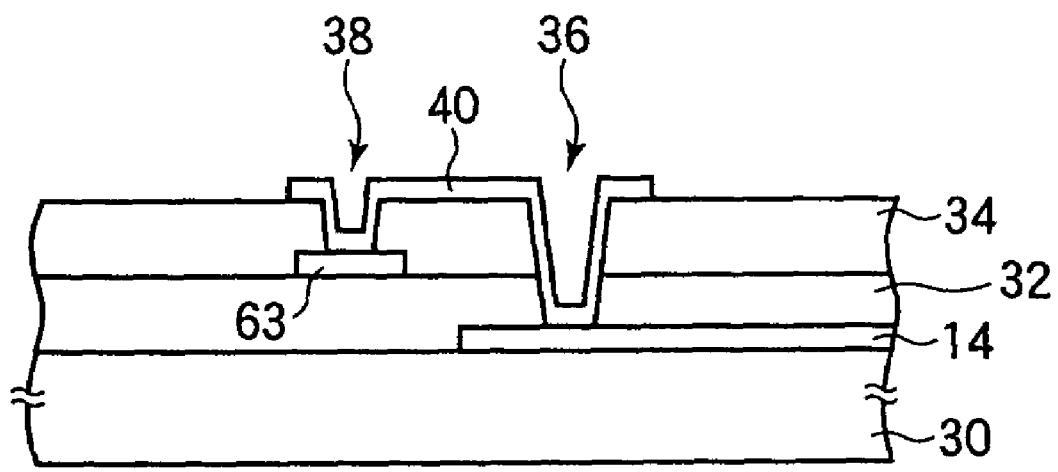
FIG. 10 is a sectional view illustrating the constitution of the substrate for the liquid crystal display device according to the eighth embodiment of the invention.

FIG. 10 is a sectional view illustrating the constitution of a region where the storage capacitor bus lines 14 are connected to the common storage capacitor wiring 63 by cutting the region in parallel with the direction in which the storage capacitor bus lines 14 are extending. Referring to FIG. 10, a contact hole 36 is formed by perforating the insulating film 32 and the protection film 34 on the storage capacitor bus line 14 formed on a glass substrate 30. A contact hole 38 is further formed by perforating the protection film 34 on the common storage capacitor wiring 63 formed on the insulating film 32. On the protection film 34 is formed a connection wiring 40 formed of the same material as the one forming the pixel electrodes. The connection wiring 40 is electrically connected to the storage capacitor bus line 14 through the contact hole 36, and is electrically connected to the common storage capacitor wiring 63 through the contact hole 38. The storage capacitor bus line 14 and the common storage capacitor wiring 63 in the regions where the contact holes 36 and 38 are formed respectively, are formed maintaining a width larger than that of other regions to reliably maintain the electric connection to the connection wiring 40.

In this embodiment, the common storage capacitor wiring 60 made of the same material as that of the storage capacitor bus lines 14 is formed on one end side of the TFT substrate 2 without being electrically connected to the gate bus lines 10. Further, the common storage capacitor wirings 62 and 63 formed of the same material as that of the drain bus lines 12 are formed on both end sides of the TFT substrate 2. Therefore the electric resistance R of the common storage capacitor wirings as a whole can be decreased and, hence, the time constant of the storage capacitor bus lines 14 can be decreased. It is therefore made possible to prevent the delay and dispersion of the input signals among the plurality of storage capacitor bus lines 14. Accordingly, a desired voltage can be applied across the pixel electrodes and the common electrode to obtain favorable display characteristics without brightness unevenness.

In this embodiment, further, the external connection terminals 42 are formed at the right upper, left upper and left lower three end portions of the TFT substrate 2. Therefore, the distance between the external connection terminals 42 and the region where the delay becomes a serious problem is nearly halved as compared with the structure in which a predetermined potential is input from one end side only of the substrate. Therefore, the electric resistance R and the additional capacitance C are both nearly halved, and the time constant becomes about one-fourth. The effect becomes more conspicuous if the external connection terminals 42 are arranged at the four corners of the TFT substrate 2. In the liquid crystal display device of the one-side-mounted type in which signals are input to the gate bus lines and to the drain bus lines from the ends on one side, however, the TCPs 50 and 52 are not connected to the right lower end portion in FIG. 9 (see FIG. 8). Accordingly, the external connection terminals 42 are arranged in the vicinity of at least a set of diagonal lines of the TFT substrate 2 (right upper and left lower end portions in the drawing), or at both ends of an end side of the TFT substrate 2 (right upper and left upper end portions in the drawing) nearly in parallel with a direction in which the storage capacitor bus lines 14 are extending.

In this embodiment, further, the transfer-forming regions 44 are arranged at four corner portions of the TFT substrate 2. That is, a predetermined voltage is applied to the common electrodes formed on the opposite substrate through four corners of the substrate. This makes it possible to decrease the time constant of the common electrode. It is therefore made possible to prevent the delay and dispersion in the input signals and to obtain good display characteristics. Further improved display characteristics are obtained if the transfer-forming regions 44 are nearly evenly arranged in the periphery of the display region.

Next, described below is a method of producing the substrate for a display device and for producing the display device equipped therewith according to the embodiment. On a transparent insulating substrate such as a glass substrate 30, there is formed, by sputtering or the like, a metal layer of, for example, aluminum (Al), chromium (Cr), molybdenum (Mo) or a laminated film thereof. Then, a resist is applied onto the entire surface of the substrate on the metal layer, followed by patterning, thereby to form a resist pattern of a predetermined shape. Next, by using the resist pattern as an etching mask, there are formed, by etching, gate bus lines 10, lower electrodes of gate bus line terminals 56, storage capacitor bus lines 14, common storage capacitor wiring 60, lower electrodes of external connection terminals 42, and lower electrodes of transfer-forming regions 44.

Next, an insulating film 32 of a silicon nitride film (SiN film) or a two-layer film of silicon oxide film ($SiO_2$ film) and an SiN film, is formed by a plasma CVD method or the like maintaining a thickness of about 400 nm on the whole surface of the substrate. The insulating film 32 on the gate electrode serves as a gate-insulating film. Then, on the entire surface of the substrate on the insulating film 32, there are formed a non-doped i-type amorphous silicon (a-Si) layer maintaining a thickness of, for example, 20 nm and an $SiO_2$ film or an SiN film maintaining a thickness of, for example, 150 nm in this order by the plasma CVD method or the like. Then, the $SiO_2$ film or the SiN film is patterned by wet etching using a hydrofluoric acid buffer solution or by dry etching using a fluorine-containing gas to thereby form a channel protection film on the regions on the gate electrodes of TFTs.

Next, an $n^+$a-Si layer is formed maintaining a thickness of, for example, 60 nm on the entire surface of the substrate by the plasma CVD method or the like. Then, a metal layer of Al, Cr, Mo or of a laminated layers thereof, is formed maintaining a thickness of, for example, 200 nm on the entire surface of the substrate by sputtering or the like. Next, a resist is applied onto the entire surface of the substrate on the metal layer, followed by patterning to thereby form a predetermined resist pattern. Next, the resist pattern is used as an etching mask to etch the metal layer, $n^+$a-Si layer and a-Si layer in this order. Thus, an operation semiconductor layer comprising the a-Si layer is formed on the gate electrodes of TFTs, and the source electrodes and the drain electrodes are formed facing each other maintaining a predetermined gap being connected to the operation semiconductor layer through an ohmic contact layer formed of the $n^+$a-Si layer. The TFTs are completed through the above steps.

Simultaneously with the formation of source electrodes and drain electrodes, further, storage capacitor electrodes comprising the $n^+$a-Si layer and metal layer are formed on the storage capacitor bus lines 14 via a dielectric layer comprising the insulating film 32 and a-Si layer, and drain bus lines 12 are formed intersecting the gate bus lines 10 via the insulating film 32. Further, lower electrodes of the drain bus line terminals 66 comprising the $n^+$a-Si layer and the metal layer are formed at the ends of the drain bus lines 12.

Simultaneously with the formation of the drain bus lines 12, further, there are formed common storage capacitor wirings 62 and 63 using the same material as the one forming the drain bus lines 12 for example, intersecting the gate bus lines 10 and storage capacitor bus lines 14 at right angles on the outer sides of the display region.

Next, on the entire surface of the substrate is formed a protection film 34 of an SiN film, an $SiO_2$ film or a composite film thereof by the CVD method or sputtering method maintaining a thickness of 400 nm so as to cover the TFTs. Then, a resist is applied and is patterned to form a resist pattern which is perforated on the source electrodes, on the storage capacitor electrodes, and on the lower electrodes of the drain bus line terminals 66, gate bus line terminals 56, external connection terminals 42 and transfer-forming regions 44. By using the above resist pattern as a mask, the protection film only is etched or the protection film and the insulation film are etched to form contact holes respectively. The etching may be the wet etching using a hydrofluoric acid buffer solution or the reactive ion etching (RIE) using a $CF_4$ gas.

Next, a transparent electrically conducting film of ITO or the like is formed by sputtering or the like maintaining a thickness of, for example, 100 nm. Next, the transparent electrically conducting film is patterned into a predetermined shape to form, for each of the pixel regions, the pixel electrodes connected to the source electrodes and to the storage capacitor electrodes through the contact holes. At the same time, the upper electrodes are formed which are connected to the lower electrodes of the drain bus line terminals 66, gate bus line terminals 56, external connection terminals 42 and transfer-forming regions 44 through the contact holes. There are further formed connection wirings 40 for electrically connecting the common storage capacitor wirings 62, 63 to the storage capacitor bus lines 14 through the contact holes 36 and 38.

In this embodiment, the common storage capacitor wirings 62, 63 are electrically connected to the storage capacitor bus lines 14 through the connection wirings 40 formed simultaneously with the pixel electrodes and through the contact holes 36, 38 formed simultaneously with the contact holes that are formed on the pixel regions and on the terminal portions. It is therefore made possible to prevent the delay and dispersion in the input signals among the plurality of storage capacitor bus lines 14 without increasing the step of production.

Figure 11:
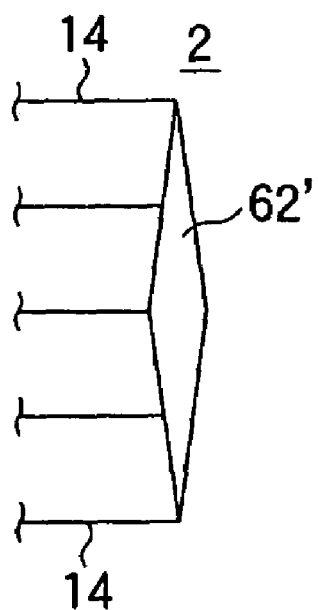
FIG. 11 is a diagram illustrating a modified constitution of the substrate for the liquid crystal display device according to the eighth embodiment of the invention.

Next, described below is a modified example of the TFT substrate according to the embodiment. FIG. 11 is a diagram illustrating the constitution in the vicinity of the common storage capacitor wiring of the TFT substrate 2 according to the modified example. As shown in FIG. 11, the common storage capacitor wiring 62' is so formed that the width thereof increases as the distance increases from the external connection terminals. That is, in a constitution in which the external connection terminals are connected to the upper and lower ends of the common storage capacitor wiring 62', the common storage capacitor wiring 62' assumes a rhombic shape on a plane as shown in FIG. 11. Though not shown, the other common storage capacitor wirings 60' and 63' possess the same constitution as that of the common storage capacitor wiring 62'. According to this modified example, there are obtained the same effects as those of the above embodiments and, besides, the electric resistances R of the common storage capacitor wirings 60', 62' and 63' can be decreased. This makes it possible to further decrease a difference in the delay of input signals for the storage capacitor bus lines 14 and, hence, to obtain excellent display characteristics further suppressing the display unevenness.

Figure 12:
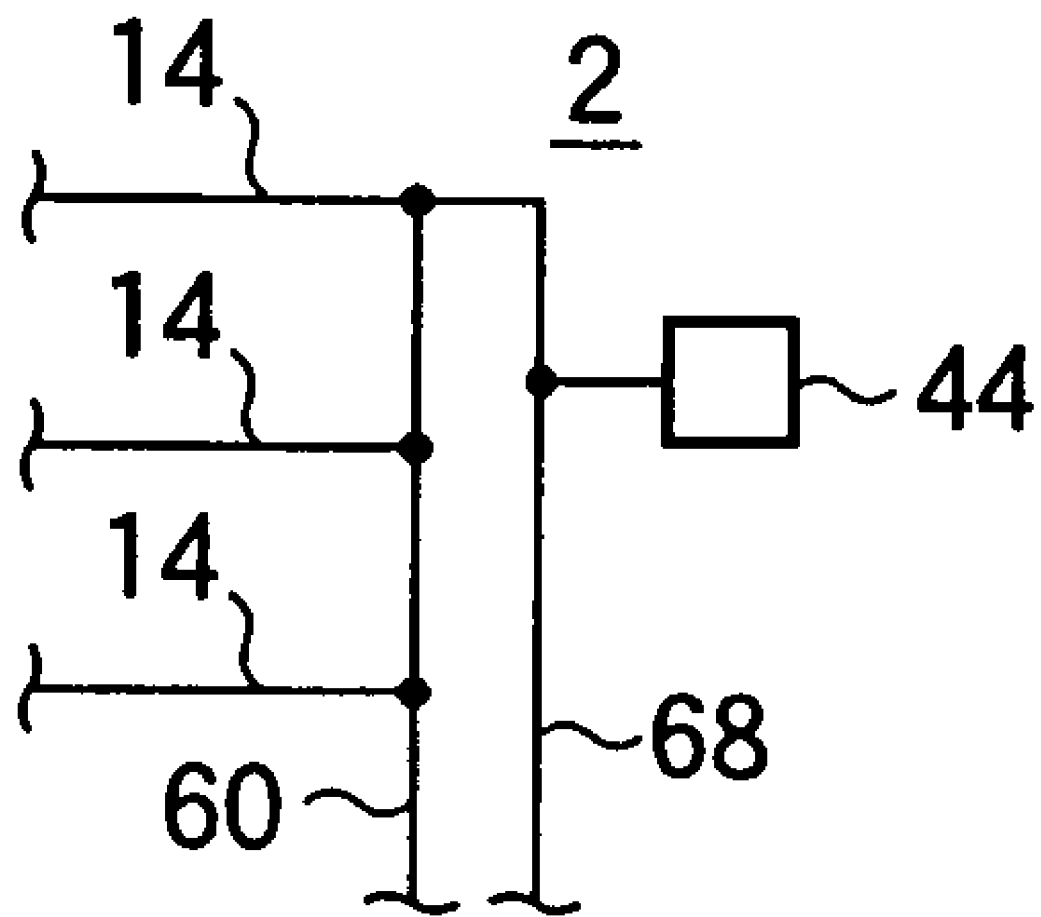
FIG. 12 is a diagram illustrating another modified constitution of the substrate for the liquid crystal display device according to the eighth embodiment of the invention.
Figure 13:
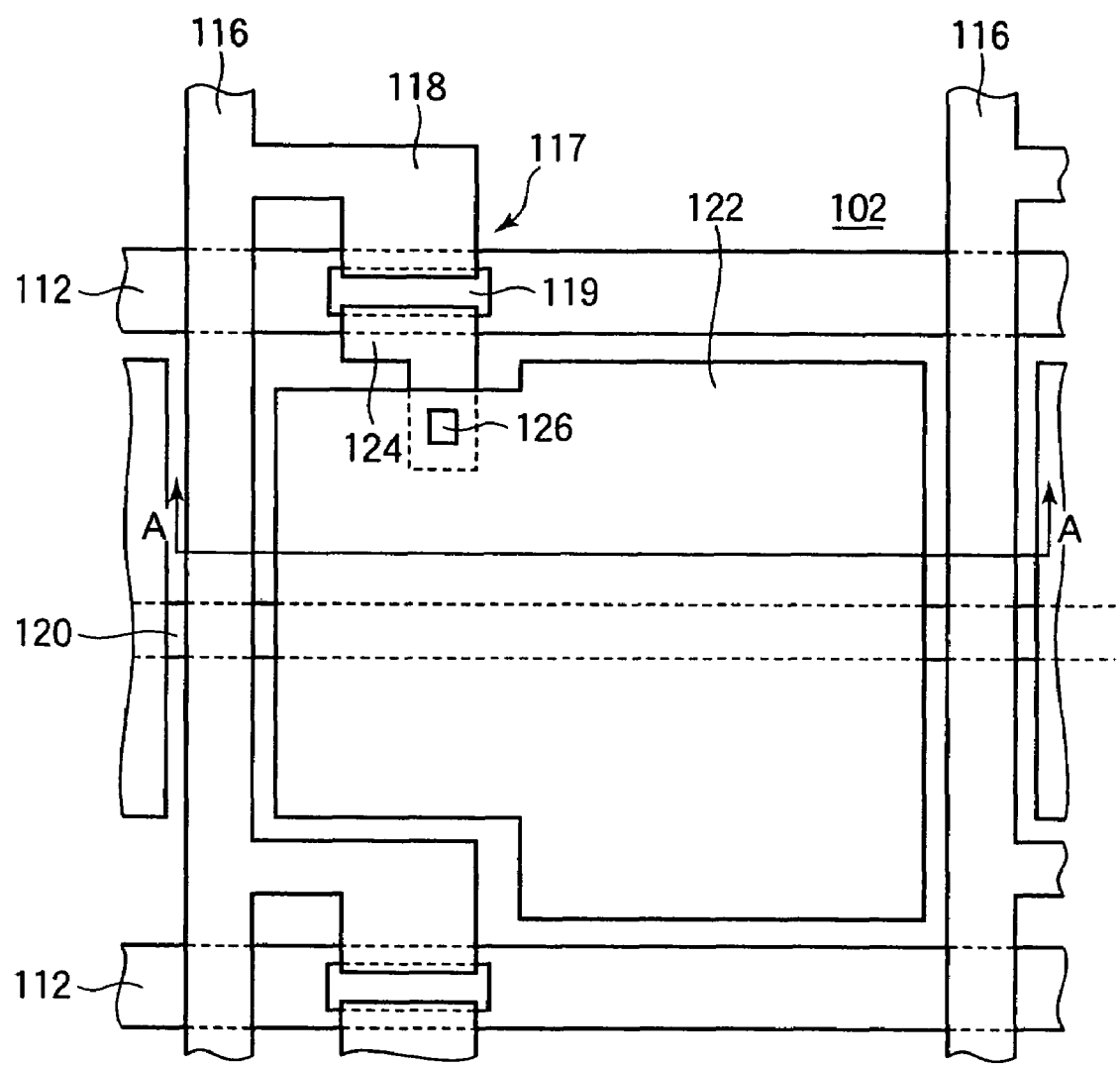
FIG. 13 is a diagram illustrating the constitution of a conventional substrate for a liquid crystal display device.
Figure 14:
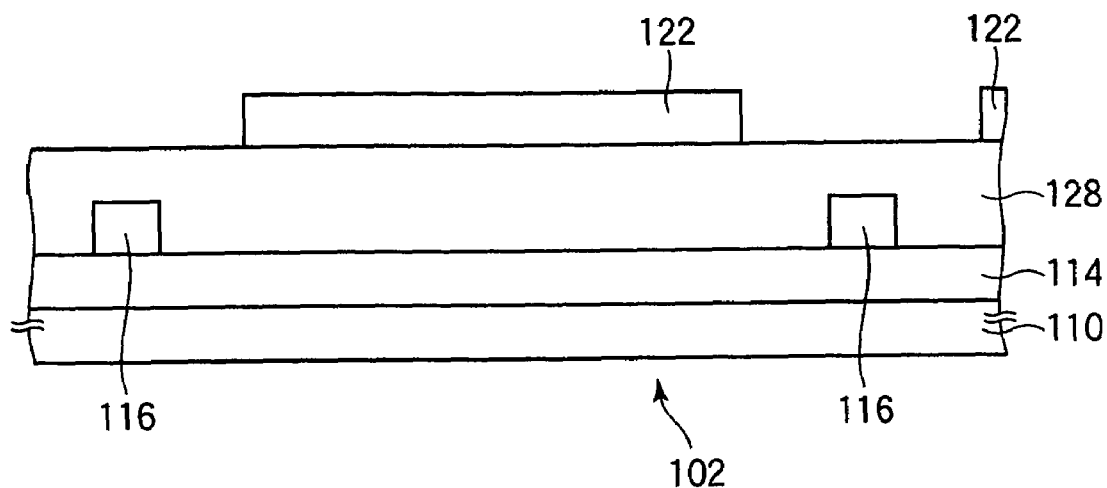
FIG. 14 is a sectional view illustrating the constitution of the conventional substrate for the liquid crystal display device.
Figure 15:
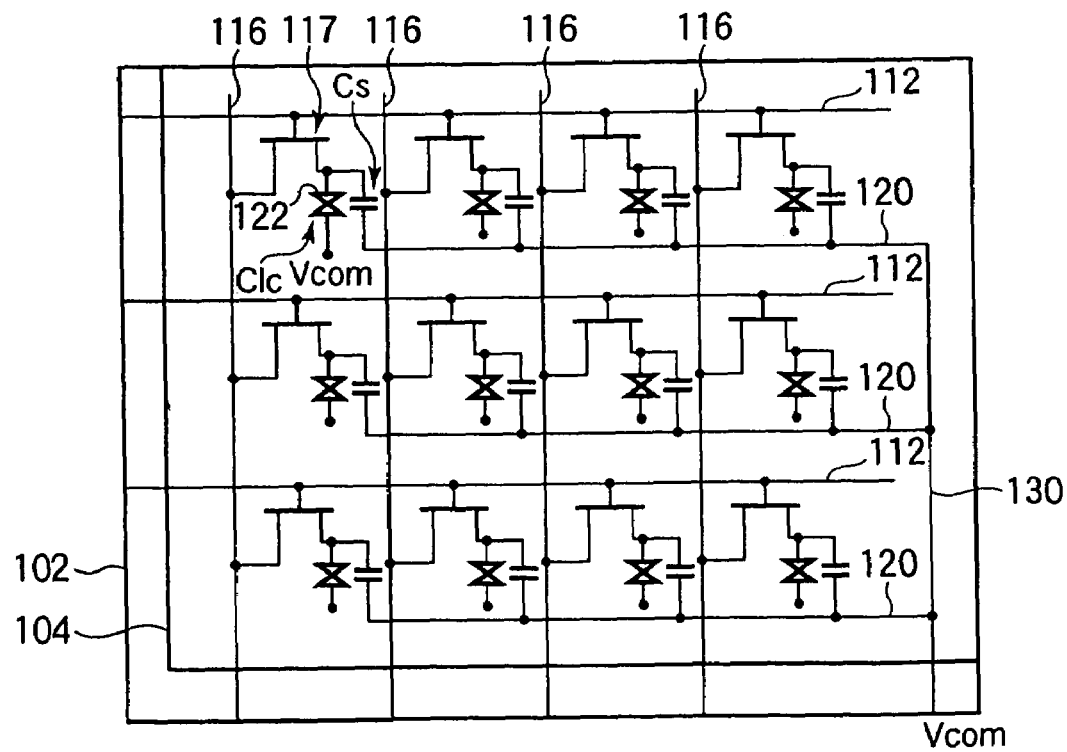
FIG. 15 is a sectional view illustrating an equivalent circuit of the conventional liquid crystal display device.
Figure 16:
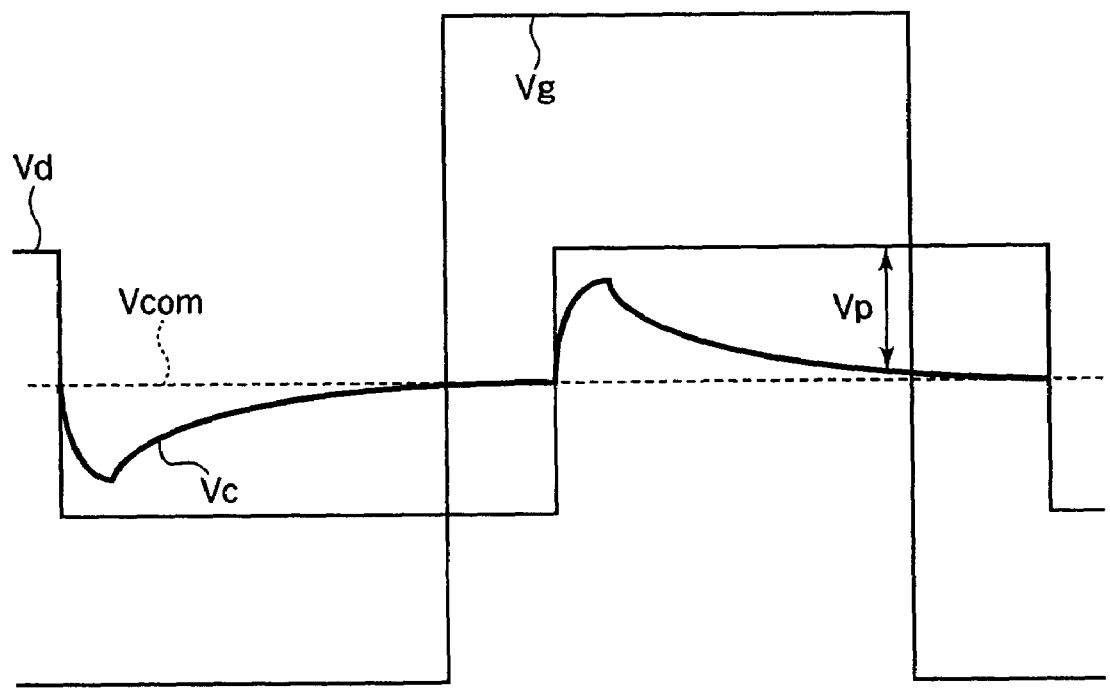
FIG. 16 is a diagram illustrating a problem in the conventional liquid crystal display device.
Figure 17:
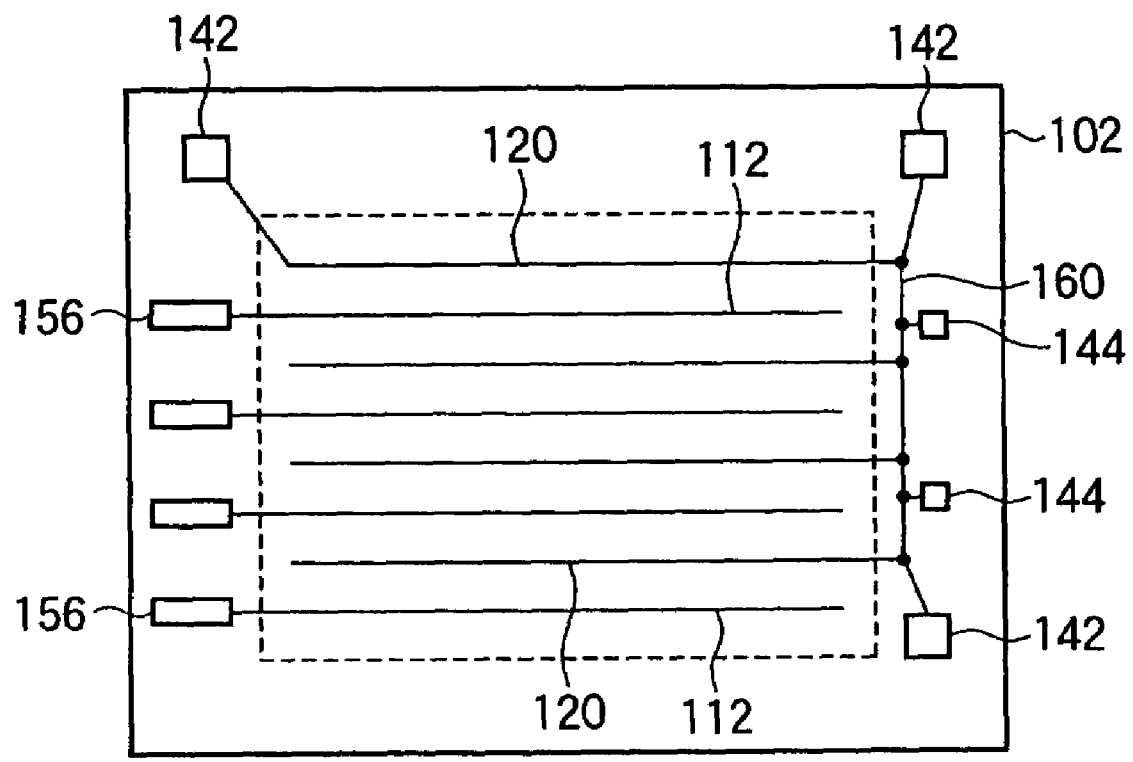
FIG. 17 is a diagram illustrating the constitution of a conventional substrate for the liquid crystal display device.
Figure 18:
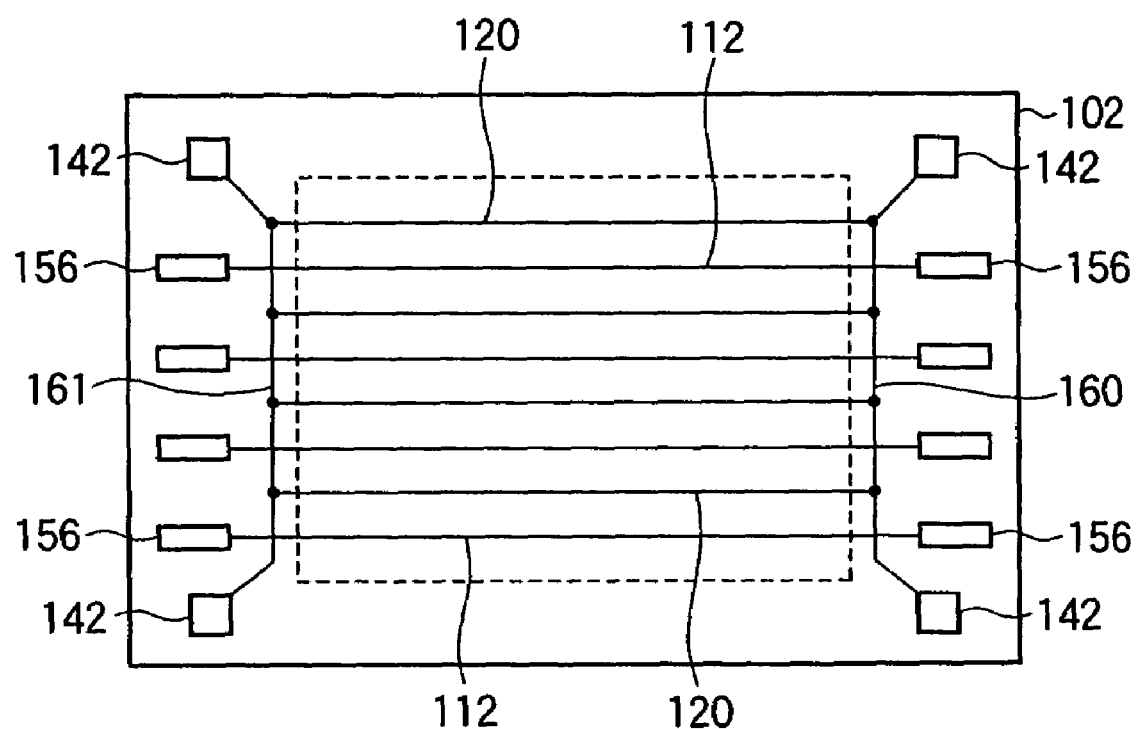
FIG. 18 is a diagram illustrating the constitution of another conventional substrate for the liquid crystal display device.

Described below is another modified example of the TFT substrate according to the embodiment. FIG. 12 is a diagram illustrating the constitution in the vicinity of the common storage capacitor wiring 60 of the TFT substrate 2 according to the modified example. As shown in FIG. 12, the TFT substrate 2 has a connection wiring 68 (third connection wiring) for connecting the common storage capacitor wiring 60 to the transfer-forming regions 44. The connection wiring 68 is formed of the same material as the one forming, for example, the common storage capacitor wiring 60. The connection wiring 68 may be connected to the other common storage capacitor wirings 62, 63, or may be formed of the same material as the one forming the common storage capacitor wirings 62, 63. This modified example, too, exhibits the same effects as those of the above embodiments.

This invention can be modified in a variety of ways not being limited to the above embodiments only.

Two common storage capacitor wirings 18 and 20 are formed in the above embodiments. Not being limited thereto only, however, there may be formed three or more common storage capacitor wirings 18, 20.

In the above embodiments, further, the common storage capacitor wirings 18 and 20 are formed of a metal layer that is forming the gate bus lines 10. Not being limited thereto only, however, the common storage capacitor wirings 18, 20 according to the invention may be formed of a metal layer that is forming the drain bus lines 12.

Further, the above embodiments have dealt with the liquid crystal display device as an example. Not being limited thereto only, however, the present invention can be further applied to other display devices such as organic EL display devices and inorganic EL display devices.

The above embodiments have dealt with the transmission-type liquid crystal display device in which the pixel electrodes are formed of a transparent electrically conducting film as an example. Not being limited thereto only, however, the invention can be applied even to other liquid crystal display devices of the reflection type and of the semi-transparent type. Further, the above embodiments have dealt with the substrate of the bottom gate type for the liquid crystal display devices as an example. Not being limited thereto only, however, the invention can be applied even to the substrate of the top gate type for the liquid crystal display devices.

In the above embodiments, further, the driver ICs are connected by the TAB mounting. Not being limited thereto only, however, the driver ICs according to the invention may be connected by any other mounting method such as COG (Chip On Glass) mounting or COF (Chip On Film) mounting.

As described above, this invention realizes a display device capable of obtaining good display quality without increasing the number of steps of production and suppressing the cost of production.

The invention claimed is:

1. A substrate for a display device comprising:
   a plurality of first bus lines formed of a first electrically conducting material in parallel on a base substrate, and receiving drive signals from one end side of the base substrate;
   a plurality of second bus lines formed of a second electrically conducting material in parallel and intersecting the plurality of first bus lines via an insulating film;
   a plurality of third bus lines formed of the first electrically conducting material in parallel with the plurality of first bus lines;
   a first common wiring formed of the first electrically conducting material on the other end side of the base substrate and connected to the plurality of third bus lines;
   a plurality of connection wirings formed of a third electrically conducting material on the other end side of the base substrate and connected to the plurality of third bus lines; and
   a second common wiring formed of the second electrically conducting material on the other end side of the base substrate and electrically connected to the plurality of third bus lines through the plurality of connection wirings.

2. A substrate for a display device according to claim 1, further comprising:
   a plurality of second connection wirings formed of the third electrically conducting material on one end side of the base substrate and connected to the plurality of third bus lines; and a third common wiring formed of the second electrically conducting material on one end side of the base substrate and electrically connected to the plurality of third bus lines through the plurality of second connection wirings.

3. A substrate for a display device comprising:
a plurality of first bus lines formed of a first electrically conducting material in parallel with each other on a base substrate and receiving drive signals from one end side of the base substrate;
a plurality of second bus lines formed of a second electrically conducting material in parallel with each other and intersecting the plurality of first bus lines via an insulating film;
a plurality of third bus lines formed of the first electrically conducting material in parallel with the plurality of first bus lines;
a first common wiring formed of the first electrically conducting material on the other end side of the base substrate and connected to the plurality of third bus lines;
a plurality of connection wirings formed of a third electrically conducting material on one end side of the base substrate and connected to the plurality of third bus lines; and
a third common wiring formed of the second electrically conducting material on one end side of the base substrate and electrically connected to the plurality of third bus lines through the plurality of connection wirings.

4. A substrate for a display device according to claim 1, wherein the first bus lines are connected to the gate electrodes of thin-film transistors formed on the base substrate, and the second bus lines are connected to the drain electrodes of the thin-film transistors.

5. A substrate for a display device according to claim 1, further comprising a plurality of external connection terminals arranged in a number of at least one on both end sides of the base substrate, electrically connected to any one of the first to third common wirings, and applied with a predetermined voltage from an external unit.

6. A substrate for a display device according to claim 5, wherein the external connection terminals are arranged on at least one end side of the second bus lines, which is on the other end side of the base substrate.

7. A substrate for a display device according to claim 1, wherein the second bus lines receive drive signals from one end side only of the second bus lines.

8. A substrate for a display device according to claim 1, further comprising a plurality of transfer-forming regions forming transfer portions for electrically connecting any one of the first to third common wirings to the common electrode formed on the opposite substrate, and a third connection wiring for connecting any one of the first to third common wirings to the transfer-forming regions, the transfer-forming regions being arranged in the vicinity of at least a set of diagonal lines on the base substrate.

9. A substrate for a display device according to claim 1, wherein the third electrically conducting material forms pixel electrodes on each of a plurality of pixel regions on the base substrate.

10. A display device equipped with a substrate having a plurality of bus lines, the substrate being a substrate for a display device according to claim 1.

* * * * *

UNITED STATES PATENT AND TRADEMARK OFFICE
CERTIFICATE OF CORRECTION

| | |
|---|---|
| PATENT NO. | : 7,626,646 B2 |
| APPLICATION NO. | : 11/405933 |
| DATED | : December 1, 2009 |
| INVENTOR(S) | : Atuyuki Hoshino |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Second Day of November, 2010

David J. Kappos
*Director of the United States Patent and Trademark Office*